United States Patent [19]
Couturier

[11] Patent Number: 4,782,496
[45] Date of Patent: Nov. 1, 1988

[54] BREAKAWAY NOZZLE FOR A LASER PROCESSING MACHINE

[75] Inventor: Donald I. Couturier, Manchester, Conn.

[73] Assignee: United Technologies Corporation, Hartford, Conn.

[21] Appl. No.: 117,253

[22] Filed: Nov. 5, 1987

[51] Int. Cl.$^4$ .............................................. H01S 3/00
[52] U.S. Cl. .................................... 372/109; 372/701; 219/121.63; 219/121.67; 219/121.70; 219/121.84
[58] Field of Search ................... 372/109, 701, 55; 219/121 LC, 121 LD, 121 LG, 121 LN, 121 LK, 121 LL, 121 FS

[56] References Cited

U.S. PATENT DOCUMENTS

| | | | |
|---|---|---|---|
| 4,027,137 | 5/1977 | Liedtke | 219/121 FS |
| 4,121,085 | 10/1978 | Diemer et al. | 219/121 FS |
| 4,427,873 | 1/1984 | Orita et al. | 219/121 LL |
| 4,467,171 | 8/1984 | Ramos | 219/121 LG |
| 4,555,610 | 11/1985 | Polad et al. | 219/121 FS |

Primary Examiner—William L. Sikes
Assistant Examiner—B. Randolph
Attorney, Agent, or Firm—Kevin E. McVeigh

[57] ABSTRACT

A laser processing machine nozzle is disclosed. The nozzle tip is detachably secured to the laser head of a laser processing machine. The nozzle tip is urged to remain in a fixed position relative to the laser head, but may be displaced by forces such as would be generated by a collision of the nozzle with an obstruction. An improved laser processing machine utilizing such a nozzle is also disclosed.

4 Claims, 1 Drawing Sheet

FIG. 1
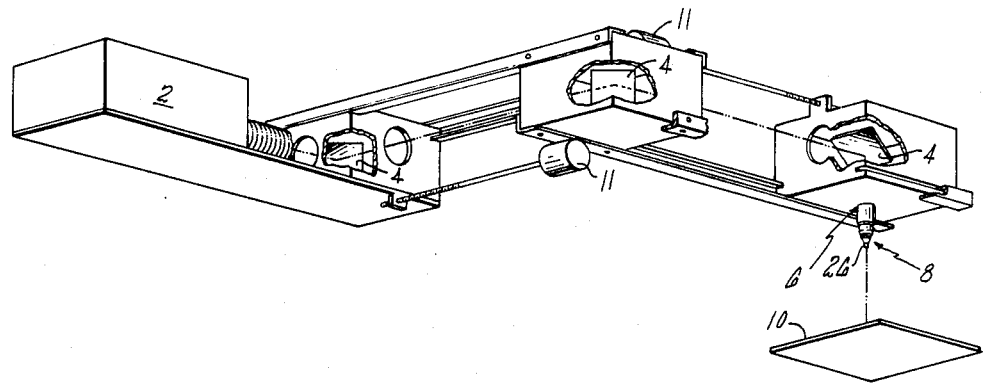
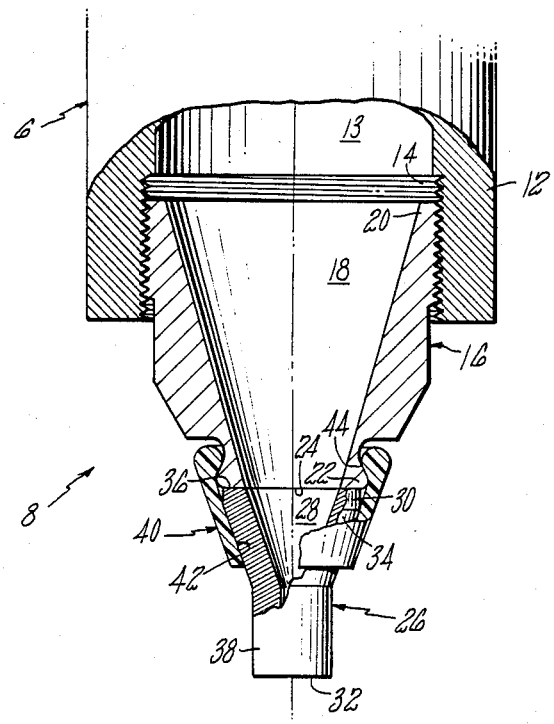
FIG. 2

BREAKAWAY NOZZLE FOR A LASER PROCESSING MACHINE

DESCRIPTION

1. Technical Field

The field of art to which this invention pertains is laser processing machines.

2. Background Art

Laser beams are widely used to process a variety of materials. Laser processing machines may be used to perform various processes on workpieces such as cutting, piercing and welding. Typically, laser beams are produced by a resonator and delivered to a laser processing machine. Within the laser processing machine the beam is reflected by a system of mirrors along a pathway through a moveable laser head, and applied, through a nozzle to the fixtured workpiece. Purge gas is simultaneously supplied through the nozzle to the area of contact of the laser beam with the workpiece.

The motion of the laser head is typically computer controlled. At times, particularly during the development of a new control program, the nozzle may inadvertently collide with an obstruction, such as the fixture which secures the workpiece. A collision may result in misalignment of the system of mirrors which determines the optical pathway of the laser beam. Realignment of the mirrors after a collision is a lengthy and tedious process during which the laser processing machine cannot be used to process additional workpieces.

Conventional laser processing machines have employed collision avoidance devices such as sensors which trigger deceleration of the laser head when an obstruction is detected or quick-blow fuses which cut power to the mechanism which drives the laser head upon a collision of the head with an obstacle. These devices have not been fully effective and misalignment of the optical system may take place before the operation of such safety devices is able to halt the movement of the laser head.

DISCLOSURE OF INVENTION

An object of the present invention is to provide a laser processing machine which provides improved tolerance of collisions between the laser nozzle and obstacles such as workpiece fixturing.

It is a further object of the present invention to reduce the downtime associated with readjusting a laser processing machine following a collision between the laser nozzle and an obstacle.

The laser processing machine of the present invention comprises a laser head for conducting a laser beam and a stream of purge gas to a workpiece, means for moving the laser head relative to the workpiece, a nozzle tip having a bore extending along one axis for allowing the passage of the laser beam and directing a stream of purge gas to the workpiece and a means for detachably securing the nozzle tip to the laser head. The nozzle tip is urged to remain in a fixed position relative to the laser head but is displaced from the fixed position if a force vector having a magnitude greater than a preselected value is applied to the nozzle tip in a direction perpendicular to the one axis.

The foregoing and other features and advantages of the present invention will become more apparent from the following description.

BRIEF DESCRIPTION OF DRAWINGS

FIG. 1 shows a resonator and laser processing machine.

FIG. 2 shows a cross-sectional view partly broken away and partly in section of a laser head and a laser nozzle.

BEST MODE FOR CARRYING OUT THE INVENTION

The laser processing machine of the present invention is conventional in all respects other than the nozzle design. Referring to FIG. 1, a resonator 2 generates a laser beam which is provided to the laser processing machine. The laser beam is directed along an optical pathway within the laser processing machine determined by a series of mirrors 4 to a laser head 6. The laser beam is focused by a lens disposed within the laser head 6 and applied, along with a stream of purged gas, through a nozzle 8 to a fixtured workpiece 10. Motor drives 11 for moving the laser head 6 and nozzle 8 relative to the workpiece 10 are provided.

Referring to FIG. 2, the laser head 6 has a wall 12 defining an internal bore 13. The wall includes an internally threaded lower portion 14.

A nozzle coupling 16 defines a central bore 18 which extends longitudinally from an externally threaded first end 20 to an externally ridged second end 22. The nozzle coupling includes a flat mounting surface 24 at the second end 22. The nozzle coupling is shown threadably engaged to the threaded lower portion 14 of the wall of the laser head 6.

A nozzle tip 26 defines a bore 28 which extends longitudinally along the central axis of the nozzle tip 26 from a first end 30 to a second end 32. The nozzle tip 26 includes an upper conical portion 34 having a flat mounting surface 36 and a lower cylindrical portion 38.

A nozzle cap 40 includes an internal surface 42 for engaging the conical portion 34 of the nozzle tip 26 and includes an internal lip 44 for engaging the ridged end 22 of the nozzle coupling 16. The nozzle cap 40 is shown engaged to both the conical section 34 of the nozzle tip 26 and the ridged end 22 of the nozzle coupling 16 to retain the nozzle tip 26 in a fixed position to the nozzle coupling 16 and thus to the laser head 6. In the fixed position the flat mounting surface 36 is disposed in contact with the flat mounting surface 24, the central bore 28 of the nozzle tip 26 is aligned with the central bore 18 of the nozzle coupling 16 and with the internal bore 13 of the laser head at 6 to allow the passage of a laser beam through the laser head 6, the nozzle coupling 16, and the nozzle tip 26 to the workpiece. The nozzle cap 40 urges the nozzle tip 26 to remain aligned in the fixed position, but allows the nozzle tip 26 to be displaced from the fixed position if a force vector is applied to the cylindrical portion 38 of the nozzle tip 26 in a direction perpendicular to the central axis of the nozzle tip 26. The force is transmitted from the nozzle tip 26 to the nozzle cap 40. The nozzle cap 40 undergoes elastic deformation to allow displacement of the nozzle tip 26 and, given a force of sufficient magnitude, to allow the internal lip 44 to become disengaged from the ridged end 22 of the nozzle coupling 16 and hence detach the nozzle cap 40 and the nozzle tip 26 from the nozzle coupling 16 and laser head 6. The nozzle cap 40 is constructed of a material, preferably a synthetic polymer such as polyvinyl chloride, having mechanical properties such that the force necessary to deform and disengage the nozzle cap 40 is small relative to the force required to misalign the optical devices in the laser processing machine. Displacement of the nozzle tip 26 from the fixed position avoids transmission of forces, such as collision forces, to the laser head and avoids misalignment of the mirror system.

After detachment due to collision of the cylindrical portion 38 of the nozzle tip 26 with an obstruction, the nozzle tip 26 and the nozzle cap 40 may be quickly and easily remounted on the nozzle coupling 16 and the laser processing machine put back into production.

The laser processing machine and the nozzle of the present invention provide improved tolerance of a collision between the laser nozzle and an obstacle and minimize the downtime associated with readjusting the laser processing machine following such a collision.

While the present invention has been described in terms of a particular embodiment, one of ordinary skill in the art could readily apply the teachings of the present disclosure to other nozzle configurations to achieve the purposes of the present invention. For example, a nozzle having a tip which may be displaced while remaining secured to the nozzle coupling might be used. Such a nozzle might include, for example, a nozzle coupling having a spherical end, a nozzle tip having a hemispherical mounting surface and a nozzle cap which does not elastically deform to the extent necessary to cause detachment from the nozzle coupling when collision forces are applied.

Although this invention has been shown and described with respect to detailed embodiments thereof, it will be understood by those skilled in the art that various changes in form and detail thereof may be made without departing from the spirit and scope of the claimed invention.

I claim:

1. A nozzle for a laser processing machine, said laser processing machine including a system of optical devices wherein the optical devices are aligned for directing a laser beam from a laser source through a laser head to a workpiece, comprising:
   a nozzle tip having a bore extending along one axis for allowing passage of a laser beam and means for displaceably attaching the nozzle to the laser head so that the nozzle tip is urged to remain in a fixed position relative to the laser head but the nozzle tip is displaced from the fixed position if a force vector having a magnitude greater than a preselected value is applied to the nozzle tip in a direction perpendicular to the one axis so that the optical devices of the laser processing machine remain aligned after application of the force vector to the nozzle tip.

2. The nozzle of claim 1, wherein the means for displaceably attaching the nozzle to a laser head comprises:
   a cylindrical nozzle coupling having a bore extending along one axis for allowing passage of a laser beam said bore extending from a first end to a second end, said first end provided with means for rigidly securing the nozzle coupling to the laser head and said second end having an external annular ridge, and
   a cap having an internal surface for engaging and retaining the nozzle tip and including an internal lip for engaging the external annular ridge of the nozzle coupling,
   wherein the lip of the cap disengages the external annular ridge of the nozzle coupling so that the nozzle tip is detached from the laser head if the force vector having a magnitude of greater than the preselected value is applied to the nozzle tip in a direction perpendicular to the one axis.

3. A laser processing machine, comprising:
   a laser head,
   means for moving the laser head relative to a workpiece,
   means for directing a laser beam from a source through the laser head to the workpiece, and
   a nozzle tip having a bore extending along one axis for allowing passage of the laser beam and means for displaceably attaching the nozzle tip to the laser head so that the nozzle tip is urged to remain in a fixed position relative to the laser head, but is displaced from the fixed position if a force vector having a magnitude greater than a preselected value is applied to the nozzle tip in a direction perpendicular to the one axis, so that the force vector is not transferred to the laser head.

4. The laser processing machine of claim 3, wherein the laser head has a wall defining an internal bore, said wall having a threaded portion, and the means for securing the nozzle tip to the laser head assembly comprises:
   a cylindrical nozzle coupling having a bore extending along one axis for allowing passage of a laser beam, said bore extending from an externally theaded end to an end having an external annular ridge, said externally threaded end threadably engaged with the threaded portion of the wall of the laser head, and a
   nozzle cap having an internal surface for engaging and retaining the nozzle tip, and having an internal lip for engaging the external annular ridge of the nozzle coupling,
   wherein the lip of the cap disengages the external annular ridge of the nozzle coupling so that the nozzle tip is detached from the laser head if the force vector having a magnitude greater than the preselected value is applied to the nozzle tip in a direction perpendicular to the one axis.

* * * * *